(12) United States Patent
Suzuki (10) Patent No.: US 11,747,829 B2
(45) Date of Patent: Sep. 5, 2023

(54) ROTORCRAFT LANDING DEVICE

(71) Applicant: AERONEXT INC., Tokyo (JP)

(72) Inventor: Youichi Suzuki, Yamanashi (JP)

(73) Assignee: AERONEXT INC., Tokyo (JP)

( * ) Notice: Subject to any disclaimer, the term of this patent is extended or adjusted under 35 U.S.C. 154(b) by 268 days.

(21) Appl. No.: 17/070,913

(22) Filed: Oct. 14, 2020

(65) Prior Publication Data

US 2021/0080977 A1  Mar. 18, 2021

Related U.S. Application Data

(63) Continuation of application No. 15/742,194, filed as application No. PCT/JP2015/069464 on Jul. 6, 2015, now Pat. No. 10,824,168.

(51) Int. Cl.
*G05D 1/06* (2006.01)
*A47G 29/14* (2006.01)
(Continued)

(52) U.S. Cl.
CPC .......... *G05D 1/0676* (2013.01); *A47G 29/14* (2013.01); *B64C 13/20* (2013.01); *B64C 39/02* (2013.01);
(Continued)

(58) Field of Classification Search
CPC ...... G08G 5/02; G08G 5/0069; G05D 1/0676; G05D 1/102; B64D 45/04; B64D 31/00; B64D 1/12; B64C 39/024; B64C 39/02; B64C 13/20; B64C 2201/128; B64C 33/02; B64F 1/32; B64F 1/00; A47G 2029/1221; A47G 29/14; G06Q 10/0832; G06Q 10/08355

See application file for complete search history.

(56) References Cited

U.S. PATENT DOCUMENTS 9,056,676 B1   6/2015  Wang
10,049,589 B1 * 8/2018  Boyd .................. B64D 47/08
(Continued)

FOREIGN PATENT DOCUMENTS

CN      203318684 U    12/2013
CN      104685436 A    6/2015
(Continued)

OTHER PUBLICATIONS

International Search Report in PCT/JP2015/069464, dated Oct. 6, 2015, 4pp.

(Continued)

*Primary Examiner* — Peter D Nolan
*Assistant Examiner* — Demetra R Smith-Stewart (57) ABSTRACT

A drone loaded with a package takes off from a takeoff device and uses a GPS system to fly to a user house that is a delivery destination of the package as the destination. Further, when the drone approaches the user house that is the destination, the flight of the drones is switched from autonomous navigation using the GPS system to remote control performed by a landing device and an in-house control device installed in the user house. The drone lands on the landing device by remote control from the landing device and the in-house control device, separates the package, and then returns to the warehouse using the GPS system and lands on the takeoff device.

8 Claims, 7 Drawing Sheets

(51) Int. Cl.

| | |
|---|---|
| *B64D 45/04* | (2006.01) |
| *B64C 39/02* | (2023.01) |
| *B64F 1/32* | (2006.01) |
| *G08G 5/00* | (2006.01) |
| *G08G 5/02* | (2006.01) |
| *B64C 13/20* | (2006.01) |
| *B64F 1/00* | (2006.01) |
| *B64D 1/12* | (2006.01) |
| *G05D 1/10* | (2006.01) |
| *A47G 29/122* | (2006.01) |
| *B64U 101/60* | (2023.01) |
| *G06Q 10/0832* | (2023.01) |
| *G06Q 10/0835* | (2023.01) |

(52) U.S. Cl.
CPC .............. *B64C 39/024* (2013.01); *B64D 1/12* (2013.01); *B64D 45/04* (2013.01); *B64F 1/00* (2013.01); *B64F 1/32* (2013.01); *G05D 1/102* (2013.01); *G08G 5/0069* (2013.01); *G08G 5/02* (2013.01); *A47G 2029/1221* (2013.01); *B64U 2101/60* (2023.01); *G06Q 10/0832* (2013.01); *G06Q 10/08355* (2013.01)

(56) References Cited

U.S. PATENT DOCUMENTS

| | | | | |
|---|---|---|---|---|
| 10,121,117 | B1* | 11/2018 | Boyd | ...................... G06V 20/13 |
| 10,198,955 | B1* | 2/2019 | Boyd | ................. G06K 7/10861 |
| 2014/0032034 | A1 | 1/2014 | Raptopoulos et al. | |
| 2015/0051758 | A1 | 2/2015 | Cho | |
| 2015/0120094 | A1 | 4/2015 | Kimchi et al. | |
| 2015/0158599 | A1* | 6/2015 | Sisko | ........................ B64F 1/20 244/114 R |
| 2015/0175276 | A1 | 6/2015 | Koster | |
| 2015/0183528 | A1 | 7/2015 | Walsh et al. | |
| 2016/0039542 | A1 | 2/2016 | Wang | |
| 2016/0144982 | A1 | 5/2016 | Sugumaran | |
| 2016/0235236 | A1 | 8/2016 | Byers et al. | |

FOREIGN PATENT DOCUMENTS

| | | |
|---|---|---|
| JP | 5-24589 A | 2/1993 |
| JP | 9-302628 A | 11/1997 |
| JP | 2005-289127 A | 10/2005 |
| KR | 20150000053 A | 1/2015 |

OTHER PUBLICATIONS

Extended European Search Report in EP Application No. 15897684.5, dated Jan. 23, 2019, 7pp.

Search Report in SG Application No. 11201710931P, dated Aug. 23, 2018, 2pp.

Written Opinion in SG Application No. 11201710931P, dated Aug. 23, 2018, 5pp.

* cited by examiner

| DRONE ID | ROUTE DATA |
|---|---|
| ... | ... |
| ... | ... |
| ... | ... |
| ... | ... |

FIG. 3

| DRONE ID | PACKAGE ID | BATTERY ID | AMOUNT OF CHARGE | ... |
|---|---|---|---|---|
| ... | ... | ... | ... | ... |
| ... | ... | ... | ... | ... |
| ... | ... | ... | ... | ... |
| ... | ... | ... | ... | ... |

ROTORCRAFT LANDING DEVICE

RELATED APPLICATIONS

The present application is a continuation of U.S. patent application Ser. No. 15/742,194 filed on Jan. 5, 2018, which is a National Phase of International Application number PCT/JP2015/069464, filed Jul. 6, 2015.

TECHNICAL FIELD

The present invention relates to a landing device for a rotorcraft to land on.

BACKGROUND ART

A small and lightweight rotorcraft referred to as a drone or a multicopter is mainly used for aerial photography, but other than such use, for example, application for delivery of a package is considered. Patent Literature 1 discloses a system for delivering a package by a rotorcraft.

CITATION LIST

Patent Literature

Patent Literature 1: US 2015/0120094

SUMMARY OF INVENTION

Technical Problem

By the way, in general, this kind of rotorcraft is equipped with a camera, and is capable of automatically landing on a destination by recognizing the topography and buildings on the basis of an image captured by this camera. However, when it is possible to freely capture an image of the surrounding environment from the air, there is a possibility that the portrait right and privacy of a person included in the captured image cannot be adequately protected. Therefore, it is desired to use a rotorcraft that does not have an image capturing function.

Therefore, an object of the present invention is to provide a mechanism for letting a rotorcraft that does not have an image capturing function land on a destination.

Solution to Problem

In order to solve the problem described above, the present invention provides a rotorcraft landing device including a landing portion on which a rotorcraft lands, a position recognition portion that recognizes a position of the rotorcraft with respect to the landing portion, and a remote control portion that remotely controls, on a basis of a result of recognition performed by the position recognition portion, the rotorcraft such that the rotorcraft not provided with an image capturing function lands on the landing portion.

The rotorcraft landing device according to the present invention may be configured to include an opening/closing mechanism including the landing portion, wherein the landing portion is formed in a portion that is inside the opening/closing mechanism when the opening/closing mechanism is closed, and wherein the landing portion takes a horizontal posture at a position a space above which is open when the opening/closing mechanism is open.

The rotorcraft landing device according to the present invention may be configured to include an opening/closing mechanism, wherein the landing portion is accommodated in an inner space when the opening/closing mechanism is closed, and wherein a space above the landing portion is open when the opening/closing mechanism is open.

The rotorcraft landing device according to the present invention may be configured to include a movable member capable of taking a first posture of extending vertically upward from a periphery of the landing portion and a second posture of extending further to an outside from the periphery of the landing portion, wherein the movable member takes the first posture when the opening/closing mechanism is closed, and the movable member takes the second posture when the opening/closing mechanism is open and the rotorcraft lands on the landing portion.

In the rotorcraft landing device according to the present invention, in a state in which the movable member is in contact with a load released from the rotorcraft that has landed on the landing portion, the movable member may be configured to be movable in such a direction as to move the load to a position closer to a center of the landing portion.

In the rotorcraft landing device according to the present invention, the position recognition portion may be configured to include image capturing portions provided at a plurality of positions on the landing portion, and recognize the position of the rotorcraft with respect to the landing portion on a basis of a result of image capturing performed by the image capturing portions.

The rotorcraft landing device according to the present invention may be configured to include a distance measuring portion that measures a distance from the landing portion to the rotorcraft, wherein the remote control portion controls a descending speed of the rotorcraft on a basis of a result of measurement performed by the distance measuring portion.

In the rotorcraft landing device according to the present invention, the remote control portion may be configured to obtain identification information of the rotorcraft that has approached the landing portion from the rotorcraft, remotely control the rotorcraft such that the rotorcraft lands on the landing portion in a case where the obtained identification information matches identification information of a rotorcraft that has already gained permission to land on the landing portion, and not perform remote control in a case where the obtained identification information does not match.

The rotorcraft landing device according to the present invention may be configured to include an ascending/descending mechanism capable of descending to a residential space for humans in a state of carrying a load received from the rotorcraft that has landed on the landing portion and ascending again to a position at which the ascending/descending mechanism receives a load.

The rotorcraft landing device according to the present invention may be provided at a position higher than a residential area of humans.

DESCRIPTION OF EMBODIMENTS

Embodiment

Figure 1:
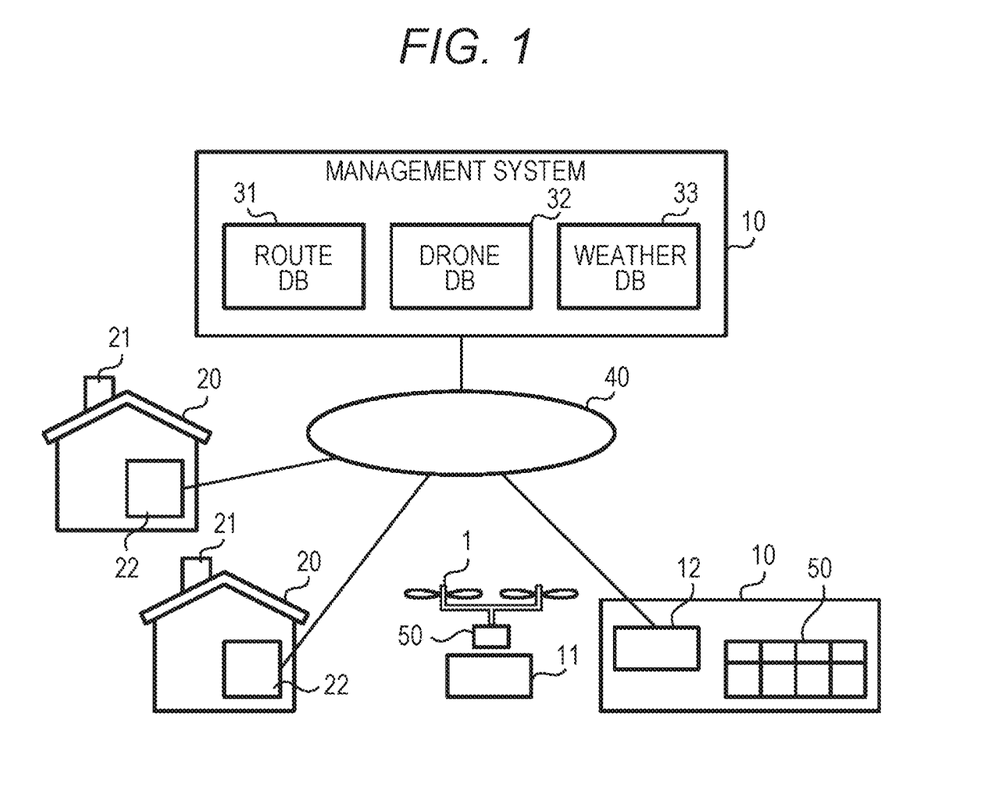
FIG. 1 is a block diagram showing a configuration of a delivery system according to an embodiment of the present invention.

FIG. 1 is a block diagram showing a configuration of a delivery system according to an embodiment of the present invention. In the present embodiment, a rotorcraft (hereinafter referred to as a drone) capable of carrying a package will be described as an example. Although a drone 1 includes a rotary wing, a motor for rotating the rotary wing, a control device for controlling these, a battery for supplying power to these, a communication portion for performing wireless communication for remote control, a GPS (Global Positioning System) system as a position measuring means, and a level and various sensors (all of which are not shown) for understanding its own posture, but it is not necessary to include an image capturing function. To be noted, although the GPS system is a position acquiring means required for the drone 1 to autonomously fly to a destination, but flight may be carried out by understanding its own position on the basis of, for example, beacon signals from a plurality of base stations located on the ground instead of the GPS system.

A lot of packages 50 to be delivered by the drone 1 are stored in a warehouse 10. In this warehouse 10, a takeoff device 11 for the drone 1 to take off in a state of being loaded with a package 50 (specifically, a state in which the package 50 is suspended below the drone 1) is installed.

An in-warehouse control device 12 provided in the warehouse 10, an in-house control device 22 provided in an user house 20, and a management system 30 provided in a facility for an administrator of the present system are each a computer including a CPU (Central Processing Unit), a memory, a mass storage device, a communication interface, and so forth. The management system 30 manages delivery of the package 50 by the drone 1. The in-warehouse control device 12, the in-house control device 22, and the management system 30 are interconnected by a communication network 40 including a wired communication path or a wireless communication path, and are capable of communicating with each other. In addition, the in-warehouse control device 12 and the in-house control device 22 are provided with a communication portion that performs wireless communication with the drone 1 for remote control.

The drone 1 loaded with a package takes off from the takeoff device 11 and uses the GPS system to fly to the user house 20 that is the delivery destination of the package as the destination. Further, when the drone 1 approaches the user house that is the destination, the flight of the drones 1 is switched from autonomous navigation using the GPS system to remote control performed by the landing device 21 and the in-house control device 22 installed in the user house 20. The drone 1 lands on the landing device 21 by remote control from the landing device 21 and the in-house control device 22, separates the package 50, and then returns to the warehouse 10 using the GPS system and lands on the takeoff device 11.

Figure 2:
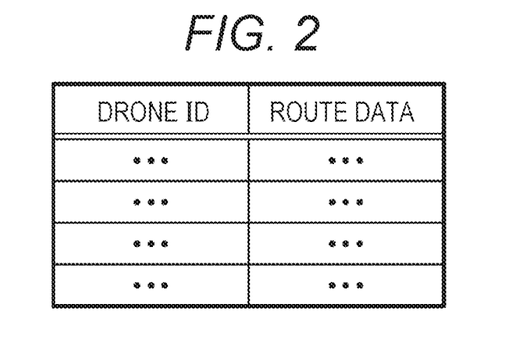
FIG. 2 is a diagram showing an example of a navigation route DB according to the embodiment.
Figure 3:
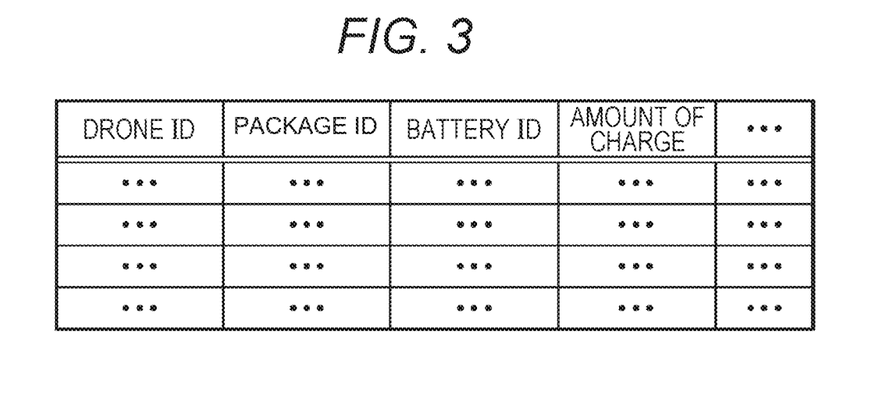
FIG. 3 is a diagram showing an example of a drone DB according to the embodiment.

In the mass storage device of the management system 30, a route database (hereinafter, database will be referred to as DB) 31, a drone DB 32, and a weather DB 33 are stored. In the route DB 31, as shown in FIG. 2, a drone ID of the drone 1 that is in flight or scheduled to fly that is identification information assigned to each drone 1, is associated with route data representing a route of the drone 1 from the departure place to the destination. The route data includes position data indicating each position on the route and a scheduled time when the drone passes through the position. In the drone DB 32, as shown in FIG. 3, the drone ID of each drone 1 is associated with a package ID assigned to the package 50 delivered by the drone 1, and furthermore, attribute information of a battery such as a battery ID that is identification information of the battery and the amount of charge thereof. The package ID corresponding to the drone ID of the drone 1 in flight or scheduled to fly is blank. The weather DB 33 includes weather data of each place supplied from, for example, the Meteorological Agency.

Figure 4:
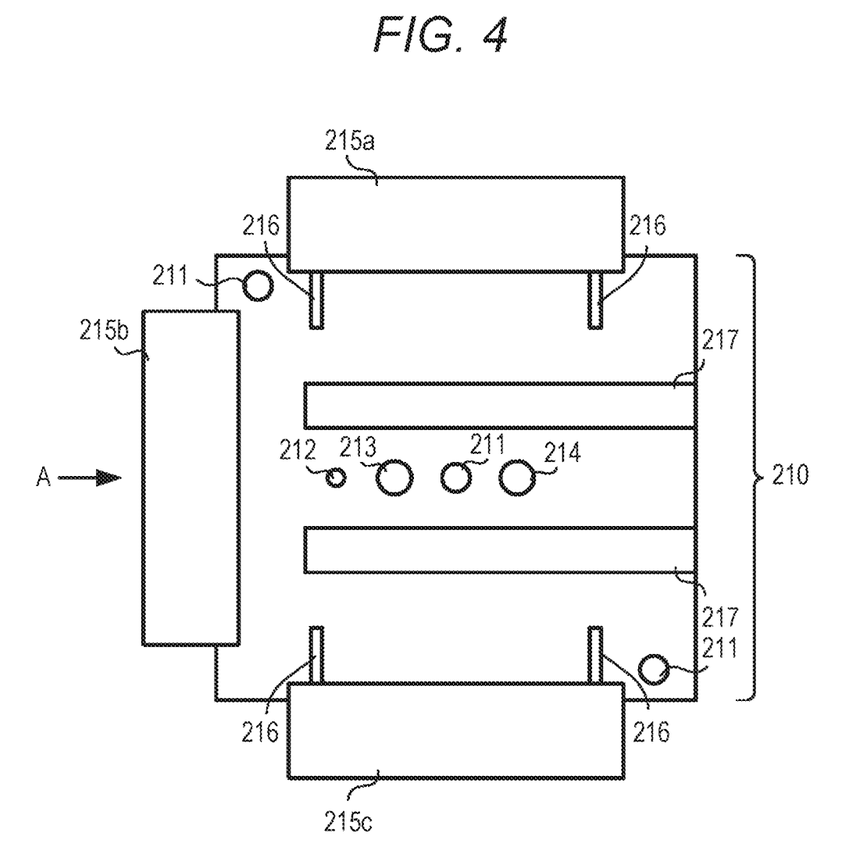
FIG. 4 is a plan view of a landing portion according to the embodiment.

The landing device 21 includes a landing portion on which the drone 1 lands and an ascending/descending mechanism for conveying the package 50 separated from the drone 1 that has landed on the landing portion to the user's residential space. FIG. 4 is a plan view of particularly a landing portion 210 viewed from vertically above among these landing portion and ascending/descending mechanism. Note that FIG. 4 is a diagram when movable plates 215a, 215b, and 215c to be described later take a second posture.

The shape of the landing portion 210 viewed from vertically above is a rectangular region larger than the upper limit size of the package 50. A plurality of (here, three) infrared cameras 211 provided on the upper surface of the landing portion 210 are each an image capturing portion that captures an image of a space vertically above the landing portion 210. The in-house control device 22 recognizes the position of the drone 1 with respect to the landing portion 210 on the basis of this captured image, and remotely controls the drone 1 such that the drone 1 lands on the landing portion 210 on the basis of the recognition result via the communication portion. Immediately before the drone 1 lands (for example, an altitude of 50 cm or less from the landing portion 210), an infrared camera 211 close to the center of the landing portion 210 captures an image of the package 50 occupying the entire viewing angle, and thus the accuracy of recognition of the position of the drone 1 decreases. Therefore, the in-house control device 22 performs remote control of the drone 1 on the basis of images captured by a plurality of (here, two) infrared cameras 211 arranged close to the edge of the landing portion 210 and on a diagonal line of the rectangular shape. That is, the infrared cameras 211 and the in-house control device 22 function as a position recognition portion that recognizes the position of the drone 1 with respect to the landing portion 210 on the basis of the image capturing result of the infrared cameras 211. In addition, on the basis of the recognition result by the position recognition portion described above, the in-house control device 22 and the communication portion function as a remote control portion that remotely controls the drone 1 such that the drone 1 having no image capturing function lands on the landing portion 210.

As described above, in the vicinity of the user house 20, the drone 1 does not autonomously land on the landing device 21, but is remotely controlled by the landing device 21, and thus there is no need to provide the drone 1 with an image capturing function for flight control. In addition, although, in the case of a drone that recognizes its own position using the GPS system and autonomously flies to and lands on the destination, automatic landing becomes difficult in an environment where a GPS signal is difficult to be transmitted, for example, between buildings, according to the present embodiment, automatic landing is facilitated even in such an environment by performing remote control from the landing device 21 side at the time of landing.

A distance measuring portion 213 provided on the upper surface of the landing portion 210 measures the distance between the drone 1 and the landing portion 210. The in-house control device 22 controls the descending speed of the drone 1 on the basis of the measurement result of the distance measuring portion 213. Although there is a possibility of erroneously measuring the distance from the drone to an obstacle in the vicinity of the landing portion 210 if the distance measuring portion 213 is provided on the drone side, the possibility of such erroneous measurement is small when the landing portion 210 is provided with the distance measuring portion 213. To be noted, in some case, the distance measuring portion 213 measures the distance from, for example, the landing portion 210 to a nearby structure such as an electric wire. In such a case, setting or registration that eliminates the influence of the structure may be performed on the distance measuring portion 213 at the time of installing the landing device 21.

An image captured by a camera 214 is supplied to a display device (not shown) of the user house 20 through a communication line, or is supplied to a mobile terminal (not shown) of a user residing in the user house 20 or a display device (not shown) of the management system 30 via the in-house control device 22 and the communication network 40. As a result of this, the user and the operator of the management system 30 can visually confirm the landing of the drone 1. At this time, since the camera 214 captures an image vertically upward from the landing device 21, that is, in a direction toward the sky, there is little possibility of capturing an image that is problematic in terms of portrait right or privacy.

The movable plates 215a, 215b, and 215c serving as movable members are provided on three sides of the landing portion 210 (a direction away from a cylindrical body 230 that will be described later and two directions orthogonal to the direction away). Vertically lower ends of the movable plates 215a, 215b, and 215c are rotatably attached to the respective ends of the three sides of the landing portion 210. These movable plates 215a, 215b, and 215c are capable of, under the control of the in-house control device 22, taking a first posture of extending vertically upward from the periphery of the landing portion 210 and a second posture of extending further outward and upward from the periphery of the landing portion 210.

Figure 5A:
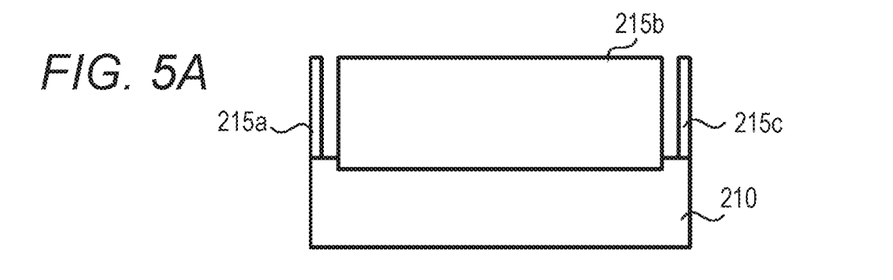
FIGS. 5A to 5D are side views of the landing portion according to the embodiment.
Figure 5B:
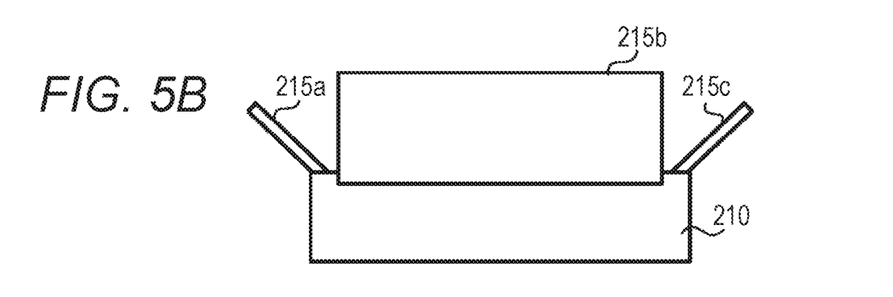

FIG. 5A is a side view of the movable plates 215a, 215b, and 215c viewed in an arrow A direction of FIG. 4 when taking the first posture, and FIG. 5B is a side view of the movable plates 215a, 215b, and 215c viewed in the arrow A direction of FIG. 4 when taking the second posture. At the time of landing of the drone 1, the movable plates 215a, 215b, and 215c take the second posture (FIGS. 4 and 5B). As a result of this, the landing portion 210 overall has a funnel-like shape spreading upward, and it becomes easier to receive the package 50 mounted on the drone 1.

Figure 5C:
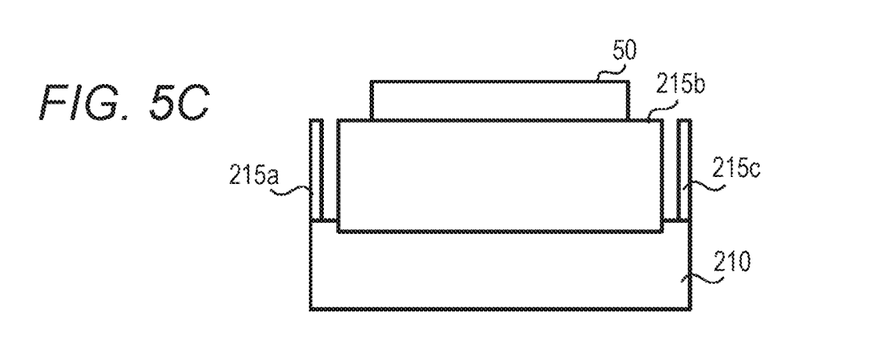
Figure 5D:
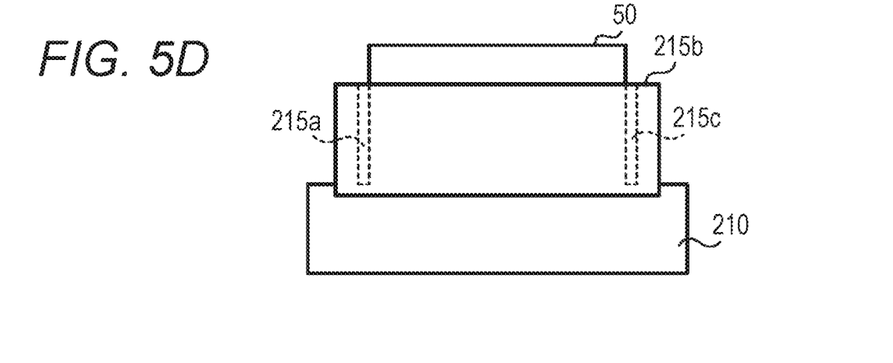

In contrast, in a state where the package 50 is separated from the drone 1 to the landing portion 210, the movable plates 215a, 215b, and 215c take the first posture (FIG. 5C) and functions as a means for preventing the package 50 from falling due to a gust or the like. After the package 50 is separated, the movable plates 215a, and 215c approach the center of the landing portion 210 along a groove 216 (see FIG. 4) under the control of the in-house control device 22. As a result of this, the package 50 is pushed toward the center of the landing portion 210, and is positioned at the substantially central portion of the landing portion 210 (FIG. 5D).

As shown in FIGS. 1 and 6, the landing portion 210 is provided in an opening/closing mechanism that opens and closes with respect to a cylindrical body 230 projecting vertically upward in a chimney shape from the top floor of the user house 20. More specifically, the landing portion 210 is formed in a portion that is inside when the opening/closing mechanism is closed (FIG. 6A), and the landing portion 210 takes a horizontal posture at a position a space above which is open when the opening/closing mechanism is open (FIG. 6B). Since the opening/closing mechanism is closed during a period other than the time of landing of the drone 1, rubber parts and the like constituting the landing portion 210 are blocked from ultraviolet light and the like and the degradation thereof is suppressed. In addition, by providing the cylindrical body 230 with a ventilation door or a ventilating fan, the increase in the temperature at the time of high temperature can be minimized, and the degradation of various parts constituting the landing device 21 can be suppressed. In addition, the infrared cameras 211, a light 212, the camera 214, the distance measuring portion 213, and the like are housed in the cylindrical body 230 during a period other than the time of landing of the drone 1, and thus are not affected by rainfall, snowfall, or the like. In addition, since the opening/closing mechanism opens only at the time of landing of the drone 1, continuous operation of the landing device 21 is possible in a light snowfall. In addition, delivery service can be provided even in a heavy snowfall in which a conventional delivery method is not useful.

Figure 6A:
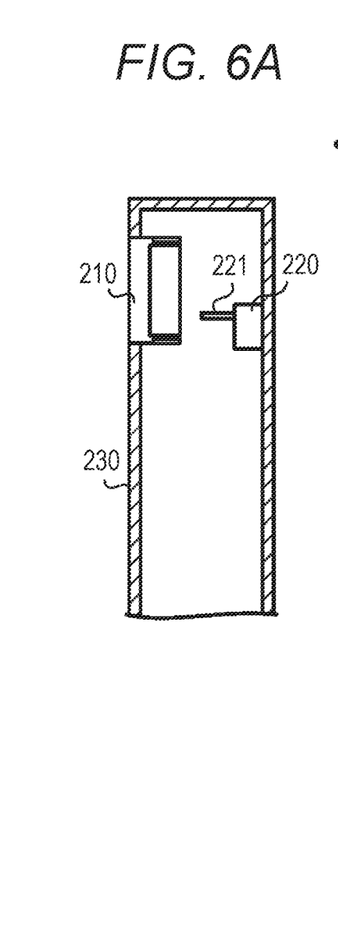
FIGS. 6A to 6D are side views of a landing device according to the embodiment.
Figure 6B:
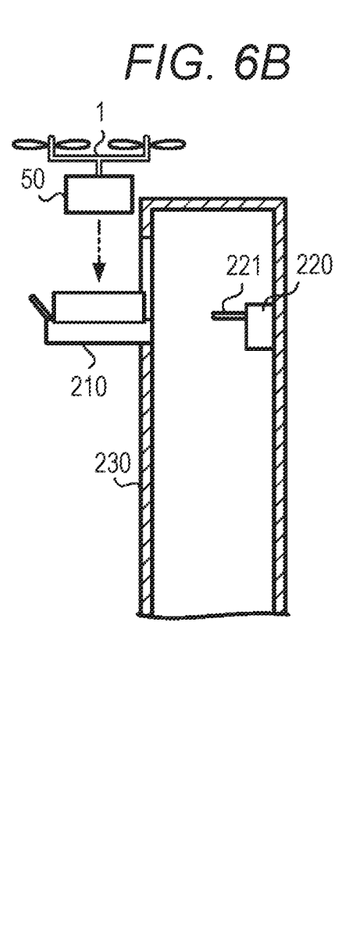
Figure 6C:
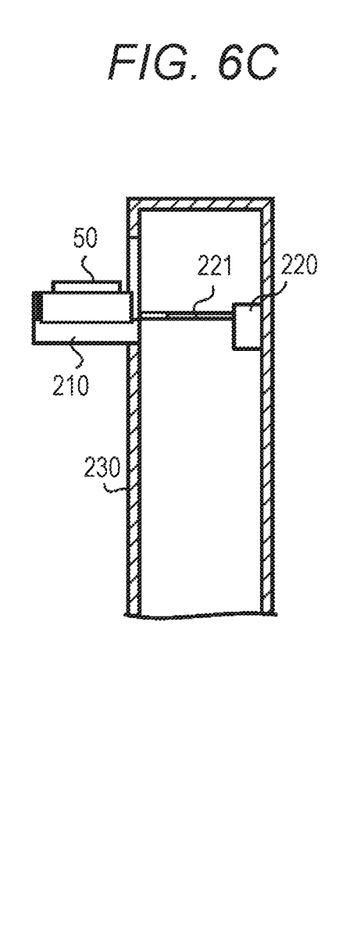
Figure 6D:
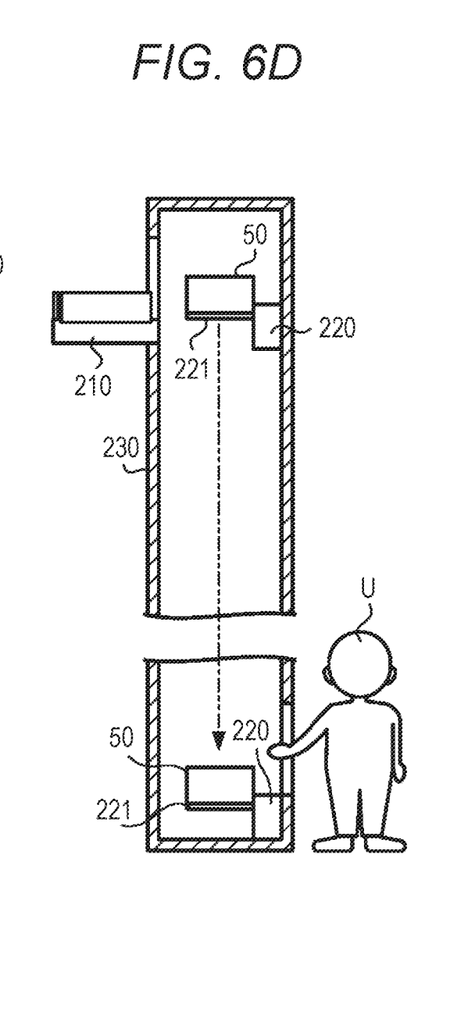

In FIGS. 6A to 6D, when the opening/closing mechanism constituting the landing portion 210 is closed, the movable plates 215a, 215b, and 215c are in the first posture (FIG. 6A). At the time of landing of the drone 1, the opening/closing mechanism changes from a closed state (FIG. 6A) to an opened state (FIG. 6B). At this time, the movable plates 215a, 215b, and 215c take the second posture. The drone 1 lands on the landing portion 210 with the package 50 suspended therebelow. When the package 50 is separated from the drone 1, the movable plates 215a, 215b, and 215c take the first posture. Then, two telescopic fork members 221 provided in the cylindrical body 230 extend to two grooves 217 (FIG. 4) provided in the landing portion 210 and are inserted into the respective grooves 217 (FIG. 6C). Then, the two fork members 221 shrink in a state of slightly lifting the package 50 vertically upward and retract the package 50 into the cylindrical body 230 (FIG. 6D). The fork members 221 are caused to descend to the residential space of a user U by the ascending/descending mechanism 220 while carrying the package 50 (FIG. 6D). The ascending/descending mechanism 220 is capable of ascending to a height at which the package 50 is again received from the drone 1.

In the case where a landing portion is installed in a yard of a user house, for example, problems such as contact between a child or an animal and a landing portion, theft of a package, an obstacle such as a tree or an electric wire at the time of takeoff and landing, and damage to a drone (mainly motor failure) caused by garbage blown up at the time of landing may be considered. Meanwhile, in the present embodiment, since the landing portion 210 is provided at a position higher than the residential space of a person, such problems can be solved. To be noted, it is desirable not to install the landing portion 210 on a roof of a first flower of a two-story house. This is because it is relatively easy for the user to get on the roof of the first floor through a window on the second floor, and there is a possibility that the user unnecessarily approaches the landing portion 210.

Figure 7:
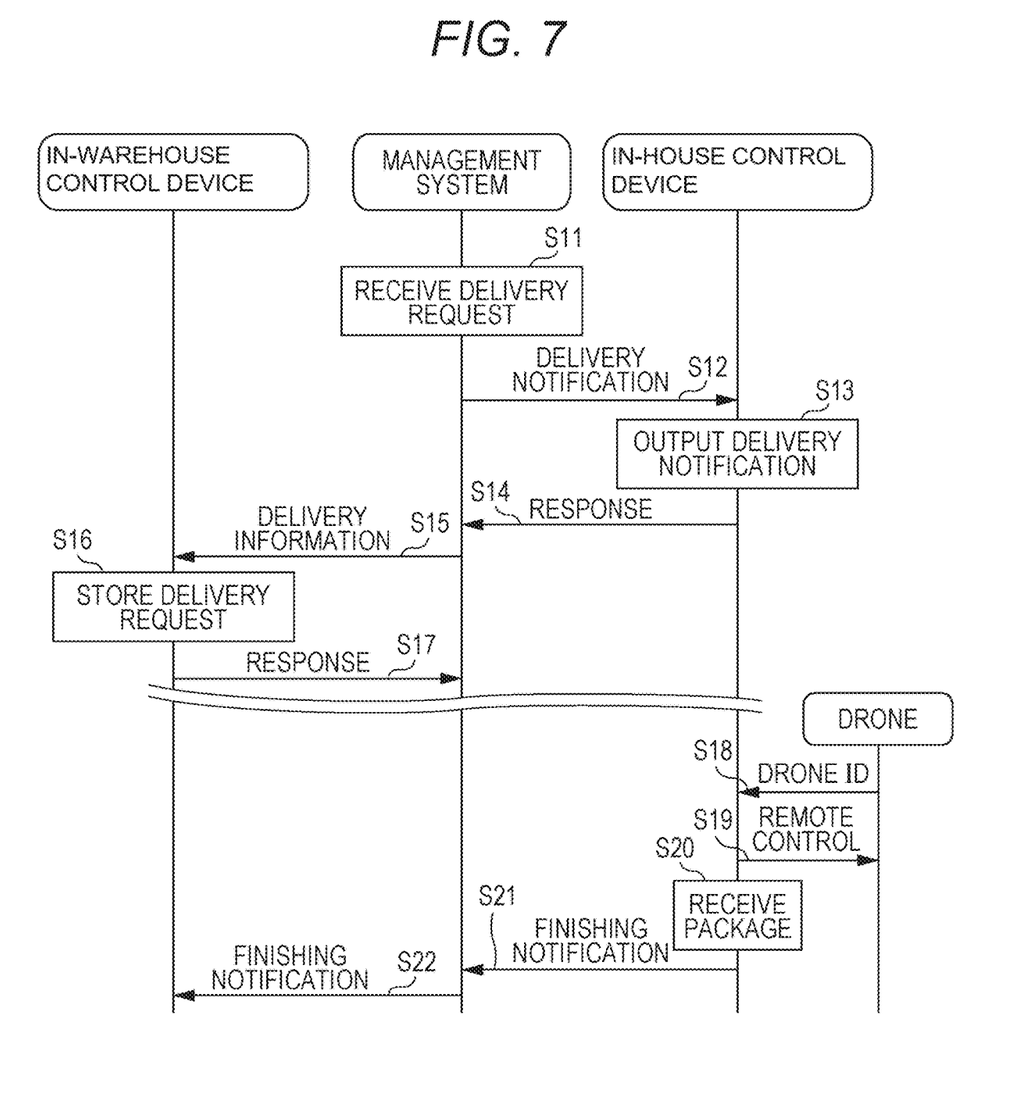
FIG. 7 is a sequence diagram of an entire system according to the embodiment.

FIG. 7 is a sequence diagram of an entire system according to the present embodiment. First, the management system 30 receives a delivery request from, for example, a shopping website used by the user (step S11). This delivery request includes a package ID, a user ID, location data of A warehouse where the package is located, location data of the user house 20 that is the destination of delivery of the package, and so forth.

The management system 30 determines the drone 1 to be used for delivery by referring to the drone DB 32, the weather DB 33, map DB that is not shown, and the like, calculates the route data, and based on contents of these, updates the route DB 31 and the drone DB 32. Then, the management system 30 transmits a delivery notification to the in-house control device 22 corresponding to the user ID (step S12). The delivery notification includes a product ID, a user ID, a drone ID, a scheduled date and time at which the drone 1 arrives at the user house 20, and so forth.

The in-house control device 22 performs output processing such as displaying information included in the received delivery notification on a display device in the user house 20 or sending the information to a mobile terminal of the user to display the information on the mobile terminal (step S13). When the user inputs an agreement for this delivery notification by, for example, operating the mobile terminal, the in-house control device 22 returns a response indicating this to the management system 30 (step S14).

The management system 30 transmits delivery information including the product ID, the user ID, the drone ID, the route data, and so forth to the in-warehouse control device 12 where the package to be delivered is located (step S15). Upon receiving and storing this (step S16), the in-warehouse control device 12 returns a response to the management system 30 (step S17).

When the scheduled takeoff date and time indicated by the route data comes, the drone 1 set by a worker in the warehouse 10 takes off from the takeoff device 11 with the package 50 suspended. The drone 1 automatically navigates to the vicinity of the destination using the GPS system, and, when the drone 1 enters an area within a threshold distance from the destination, the drone 1 wirelessly transmits the drone ID from the communication portion (step S18). When the communication portion receives the drone ID transmitted from the drone 1 approaching the landing portion 210, the in-house control device 22 determines whether the received drone ID matches the drone ID of the drone 1 which has obtained permission in advance for landing on the landing portion 210 (the drone ID included in the delivery notification received in step S12). In the case of a match, the in-house control device 22 transmits a signal to the drone 1 to switch from the autonomous navigation of the drone 1 to the remote control by the in-house control device 22, and remotely controls the drone 1 so as to land on the landing portion 210 (step S19). In contrast, in the case where the received drone ID does not match the drone ID of the drone 1 which has obtained permission in advance for landing on the landing portion 210 (the drone ID included in the delivery notification received in step S12), the in-house control device 22 does not perform remote control.

After reception of the package is finished in the procedure described with reference to FIGS. 6A to 6D (step S20), the in-house control device 22 transmits a finishing notification to the management system 30 (step S21). Upon receiving this notification, the management system 30 transmits a finishing notification to the in-warehouse control device 12 (step S22).

As described above, according to the present embodiment, it is possible to let a drone having no image capturing function land on a destination.

Modification

The above embodiment may be modified as follows.

[Modification 1] Landing Device in Non-Snowy Area

Figure 8:
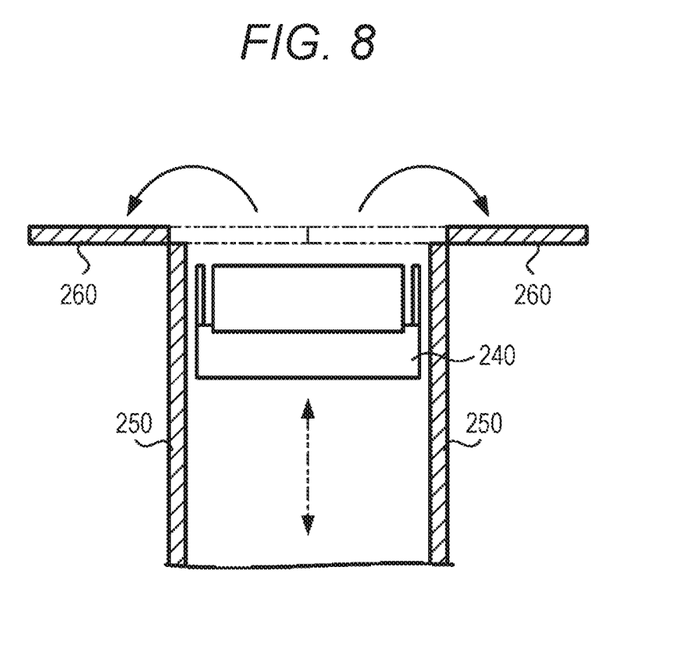
FIG. 8 is a side view of a landing device according to a modification.

Although the landing device 21 described in the embodiment is a mechanism capable of withstanding a large snowfall, in a non-snowy area, a landing device having a configuration as shown in FIG. 8 may be used. A landing portion 240 is accommodated in a cylindrical body 250 projecting vertically upward in a chimney shape from the top floor of the user house 20, and an opening/closing mechanism 260 is provided at an upper end of the cylindrical body 250. Since the opening/closing mechanism 260 is closed in a period other than the time of landing of the drone 1 and the opening/closing mechanism 260 opens only at the time of landing of the drone 1, continuous operation of the landing device is possible in a light snowfall. A ventilation door and a ventilating fan may be provided in the cylindrical body 250. In FIG. 8, at the time of landing of the drone 1, the opening/closing mechanism 260 changes from a closed state (dotted line in the figure) to an open state (solid line in the figure). The drone 1 lands on the landing portion 240 with the package suspended. When the package is separated from the drone 1, the landing portion 240 descends to the residential space of the user U by an ascending/descending mechanism. The ascending/descending mechanism is capable of ascending to a height at which the package is again received from the drone 1.

As described above, the landing device according to the present invention may include an opening/closing mechanism, wherein a landing portion is accommodated in an inner space when the opening/closing mechanism is closed, and wherein a space above the landing portion is open when the opening/closing mechanism is open. By adopting such a structure that the landing portion 240 directly reaches the user, the mechanism of the landing device is simplified and the maintenance property is improved such that the camera and the like can be reached from the inside of a room to be cleaned. This type of landing device is also suitable for an area (for example, a villa area) in which, for example, a large amount of leaves fall, by properly performing airtight treatment and countermeasures against snowfall on the opening/closing mechanism 260.

[Modification 2] Combination with Residential Equipment

A ventilation device or a smoke exhaustion device may be installed in the cylindrical body 230 of the landing device 21 such that the device is used in combination with a ventilation system normally provided in a house or a smoke exhaustion system used in the case of a fire. This enables reducing the production cost of the house. For example, a smoke exhaustion system of the landing device 21 cooperates with a fire alarm in the house and performs smoke exhaustion when a fire occurs. Furthermore, at the same time as the occurrence of the fire, a drone for reporting and observation of disaster may be sent to a place where the fire has occurred. Since the landing device 21 is installed at a position higher than the residential space, a higher smoke exhausting effect can be expected than in the case of being installed in the residential space.

[Modification 3] Weather Observation Device

Weather observation devices for observing weather data such as wind speed, wind direction, temperature, humidity, rainfall, visibility, atmospheric pressure, and so forth may be installed in each landing device 21. The in-house control device 22 transmits weather data acquired by these weather observation devices to the management system 30. The management system 30 accumulates, in the weather DB 33, the weather data transmitted from the in-house control device 22 in addition to the usual weather observation system held by the Meteorological Agency or the like, and thus, for example, it is expected that a low atmospheric pressure locally occurring is identified. Furthermore, the management system 30 may determine whether the drone 1 may fly or not by referring to a fault database in which causes of fall of the drone 1 are stored by being classified into body causes, weather condition causes, physical fault causes system causes, and so forth.

Since the management system 30 understands detailed weather conditions by means of the weather observation devices provided in the landing device 21, it can be expected that, for example, appearance of clouds that will cause locally occurring guerrilla rainstorms in urban areas is predicted and start of rainfall is understood at the level of one minute before the start. The user may set in advance an emergency forecast level of a level requested by the user in the management system 30, and the management system 30 give a warning to the mobile terminal of the user or the like when there is a sudden change in the weather in the area where the user is present or the area where the landing device 21 is present.

[Modification 4] Temporary Use at the Time of Emergency Landing

In the embodiment, the landing device 21 is used for the package delivery service, but the landing device 21 may be provided as an emergency landing destination of a drone flying around. When the drone 1 makes an emergency landing, for example, a relatively safe evacuation place such as a river, a forest, or a roof of a large factory can be found in a suburb, but it is difficult to secure such a place in an urban area. Electric wires and pedestrians get in the way in the case of landing on the road or the like, it is necessary to consider lightning rods and people's coming and going in the case of a rooftop of a building. Therefore, the drone 1 detects a voltage drop of the battery, abnormality of the motor, and so forth, and if it is determined that the drone 1 cannot reach a landing facility in which maintenance can be performed, the drone 1 issues an emergency signal wirelessly from the communication portion. Among landing devices 21 that has received the emergency signal, a landing device 21 for which no arrival of another drone is expected transmits an acceptance signal. When the drone 1 receives the acceptance signal and responds, the landing device 21 remotely controls the drone 1 in the same manner as the embodiment and to cause the drone 1 to land on the landing portion 210.

[Modification 5] Portable Landing Device

Immediately after a disaster such as an earthquake, use of an industrial drone whose main task is to confirm the damage situation is assumed. A landing device corresponding to the landing portion 210 of the embodiment may be delivered as a portable landing device for disaster to a place for which relief supplies are deemed necessary in such a disaster (for example, a public facility such as a government office or a school). This enables transportation of relief supplies by a drone. The landing portion 210 is equipped with a battery, a camera, an infrared camera, a distance measuring portion, a GPS, and a communication portion. This communication portion has a repeater function, and is capable of communicating with a communication portion of another landing portion 210 within a communication range. Therefore, even in the case of a large-scale disaster in which a communication function has been lost, each of the landing portions 210 serves as a repeater, functions as a relay base of a drone loaded with relief supplies, and conveys information.

To be noted, although the landing device 21 is basically intended for a detached house or the like, this is not limiting, and the landing device 21 can be also used in a public facility or a temporary event venue.

[Modification 6] Response at the Time of Fall

For example, it is possible that all drones 1 fall at the same time due to the occurrence of, for example, a solar storm. In such a case, parachutes provided in the drones 1 are supposed to open for soft landing, but people on the ground may be notified that there is a drone 1 falling from the sky. Specifically, a whistle may be attached to the parachute so that sound comes from the whistle by the air resistance when the drone 1 falls.

[Modification 7] Approach Warning of Drone Equipped with Camera

Since the drone 1 described in the embodiment does not have an image capturing function, privacy is not invaded even if the drone 1 flies on a daily basis. However, in reality, a certain number of drones equipped with an image capturing function (camera) also fly, and therefore warning may be issued to a user in the case where this kind of drone equipped with a camera approaches the landing device 21. The table below is an example of classification of drones.

TABLE 1

| class No. | Type of drone | Comprehensive control | camera | package transportation | Manual control | Automatic flight | Proximity measurement | Emergency landing | Approach warning |
|---|---|---|---|---|---|---|---|---|---|
| class 1 | Industrial drone | ○ | ◎ | ◎ | ○ | ◎ | ◎ | ○ | ◎ |
| class 2 | Aerial photographing drone | ◎ | ◎ | X | X | ◎ | ◎ | ◎ | ◎ |

TABLE 1-continued

| class No. | Type of drone | Comprehensive control | camera | package transportation | Manual control | Automatic flight | Proximity measurement | Emergency landing | Approach warning |
|---|---|---|---|---|---|---|---|---|---|
| class 3 | Delivery drone | ◎ | X | ◎ | X | Δ | X | ◎ | X |
| class 4 | hobby drone | Δ | ◎ | X | ◎ | Δ | X | X | ○ |

The meaning of each item in the above table is as follows.

Comprehensive control: whether or not a function to fly by instruction of, for example, takeoff, route, and avoidance from a comprehensive control system is provided (A: always provided, B: often provided, F: not provided, the same applies below)

Camera: whether or not a camera is provided

Package transportation: whether or not a package transportation function is provided Manual operation: whether or not a function to change the route according to the intention of a user is provided Automatic flight: whether or not a function to fly a route reflecting the intention of the user by autonomous navigation is provided Proximity measurement: whether or not a function to acquire the position of electric wires and trees in real time and automatically avoid contact is provided Emergency landing: whether or not a function to use the landing device as a landing site in emergency is provided Approach warning: whether or not the drone is a target for warning when the drone is approaching the landing device (A: a drone to which a warning is always issued, B: a drone to which a warning is often issued, F: a drone to which no warning is issued)

An industrial drone of class 1 is a drone specialized in specific work requiring advanced technology such as surveying, bridge inspection, spraying of agricultural chemicals, disaster support, and movie shooting. Although manual flight by the operator's intention can be performed in addition to automatic flight using the comprehensive control system, in general, it is not permitted to enter a non-flight area or an area out of statutory regulations.

An aerial photographing drone of class 2 is a drone for, for example, shooting of a photograph or a movie, and in general, a route plan is applied before flight. This route plan can be confirmed in advance by using a simulator. Even in the case of an aerial shooting drone, it is impossible to shoot in an area where shooting is prohibited, or image processing such as mosaic processing is applied.

An delivery drone of class 3 is a drone aimed at aerial transportation, and is responsible for short-distance and lightweight aerial package shipment. Extremely heavy packages are in the scope of an industrial drone. The user can set a departure place, a destination, a load weight, arrival time, and so forth. No delivery drone is equipped with a camera, and thereby the possibility of privacy violation is eliminated. The delivery drone automatically navigates by using the GPS or beacon to the vicinity of a landing device that is the destination, and, in the vicinity of right above the landing device, communicates with the landing device, and leaves the control to the landing device. At the stage of entering a certain altitude after delivery of the package, the control by the landing device is canceled.

A hobby drone of class 4 is a drone aiming for hobby use and simple aerial photography. Although a GPS system is installed, automatic navigation is not allowed. Automatic go-home by user's intention or stoppage of control wave is allowed. Although FPV (First Person View), that is, confirming an image obtained by aerial photography by a monitor on the ground in real time is allowed, the distance of view thereof is limited to about 100 m. By assigning a dedicated frequency, the landing device can detect the existence of the hobby drone.

[Modification 8] Battery

The management system 30 may acquire and store various attribute information on the battery of the drone 1 from the in-warehouse control device 12 or the like. Specifically, a charger connected to the in-warehouse control device 12 transmits the battery ID that is identification information of the battery, the charge amount of the battery, the current voltage, and anticipated charge completion time to the management system 30 via the communication network 40. The management system 30 stores the battery ID, the voltage change of the battery of the drone 1 in flight, and the state of charge of the battery, and judges the state of deterioration of each battery on the basis of these.

[Modification 9] Black Box

Besides hobby drones, it is obligatory to carry a black box. This is for afterwards investigation of cause of becoming out of control and crashing and for deterrence of criminal acts. In the black box, the following information is recorded for a certain period of time.
Position data of the drone (latitude, longitude, and altitude at a level with which the flight can be reproduced after the accident)
Image data of the camera installed in the drone (360° including right above and right under)
Battery installation history in the drone
Voltage change of the battery installed in the drone
Change in motor speed of the drone in flight Although a delivery drone is not to be provided with a camera in principle, a camera for a black box may be installed as an exception to this principle. Images of this camera will not be taken out except for the time of an accident.

The camera installed in the black box is subjected to initial check before flight by the following procedure.

1 Flight permission is granted from the management system 30.
2 The drone is loaded with the package and set on the takeoff device.
3 The final confirmation before takeoff is done (communication check between the drone and the takeoff device).
4 Random alphanumeric characters (ex: A8u6IV684s) are displayed on a display screen of the takeoff device.
5 A camera of the black box captures an image of the display screen and transmits the random alphanumeric characters to the takeoff device as character data.
6 If the two sets of random alphanumeric characters match on the takeoff device side, takeoff permission is issued to the drone.

There is a possibility that a delivery drone is for a crime by a worker on the site. Examples thereof include stealing the package along the way, installing another camera to secretly photograph the delivery destination, mounting a bomb thereon to use the drone for terrorism. For deterrence of such crimes and for arresting the criminal, a camera is attached to the black box. The above initial check is carried out in order to confirm that this camera is operating normally immediately before takeoff.

[Variation 10] Takeoff Device

The procedure until takeoff is as follows. The package 50 is put in a load receiving part of the takeoff device. In the takeoff device, the outer size is acquired from a barcode on the outer box of the package. On the basis of measured actual weight, the minimum required drone standard is selected. Whether load inclination occurs during flight is estimated by an inclination test. Whether or not a hazardous object (explosive/sprayer) or the like is in the package is confirmed. In the case of dedicated delivery of food and drink etc., the inclination test is omitted. Instead, a dedicated box is devised to prevent inadvertent biased loading in the air.

[Modification 11] Route

A delivery drone flies through the following routes.

Public roads and right above rivers: Due to the air rights, a drone flies above public roads and right above rivers in accordance with the same law as the car (left-hand traffic and relationships of priority roads). At an intersection, the flight altitude is kept at a value shown in a navigation map to avoid collision. When merging to a priority road, the merging is performed without collision by using a sensor installed in the drone while confirming an approaching drone in cooperation with the management system 30. Designated route: the drone can fly in the route even right above a private property of a third party. Mainly setting is performed in advance if it is irrational right above the road. A route is set by obtaining permission and the like from the landowner.

Private property of delivery destination: the drone can fly in the route even right above a private property of a third party.

[Modification 12] Beacons (Base Station)

In order to indicate a correct route to the drone and for safe operation, base stations provided with a beacon are installed at constant intervals. The landing device, a traffic light, a street light, a mobile base station, a power transmission line, and so forth serve as installation places for the base stations. The functions installed in the base stations are as follows.

Storage portion for position information (latitude, longitude, height above sea level, installation height, and ground height)

Anemometer, barometer, rain gauge, and visibility meter
Communication portion with the drone
Camera The drone 1 is connected to the management system 30 via the base station. The camera captures an image of a drone flying in the vicinity and constantly monitors drones that are not allowed to fly.

[Modification 13] Countermeasures Against Drones for Terrorism

Terrorism from low altitude occurring in an illegal drone not managed by the system may be prevented. The positions and purposes of flight of other drones than hobby drones are managed by the system, and even in the case of hobby drones, the approximate number and positions thereof can be understood by understanding the frequency range used by the drones for radio communication.

Beacons installed in various places observe the operating states of various drones. When a drone that satisfies a specific condition (speed, altitude, movement range, and ID) appears in this beacon network, a warning is issued to the management system 30. The management system 30 instructs the system on the following defense policy in accordance with the scale of terrorism that can be assumed.

Warning: at the warning stage, it is indicate that there is a possibility of terrorism caused by a drone, and it is instructed that people should get in buildings and close the window. Since warnings can be also made to mobile terminals other than the fixed landing device, occurrence of terrorism in a traveling destination can be also addressed.

Flight restriction: new flight of a drone in a specific area is prohibited. If necessary, the drone lands on the nearest landing device by emergency landing. A drone secured by flight restriction can be borrowed temporarily as a counter-terrorism aircraft.

Strengthen observation: the camera of the landing device is activated and a captured image of a space right above is sent to the management system 30. The black box installed in the drone 1 is also released. This enables sending images also from the delivery drones to the management system 30, and thus enables blocking and interception using the visually recognized information.

Blocking: various drones are deployed at places such as rivers where there is no harm even if the drones fall to interrupt (block) the flight by causing the drones to float in the advancing direction of the drone for terrorism. Since this blocking network is likely to be broken if the number is small against the drone for terrorism, a large number of drones are deployed in an important block. Even if the terrorist uses saturation attack, since a large number of delivery drones are in operation, a great defensive effect can be expected.

Interception: a drone aimed at intercepting the drone for terrorism is deployed in an important area. In a preset intercepting permission area, the drone approaches the drone for terrorism, oscillates electromagnetic noise, and causes the drone for terrorism to crash on the spot. The own drone will spread the parachute and fall.

The invention claimed is:

1. A rotorcraft landing device comprising:
   a landing portion on which a rotorcraft lands, the landing portion provided at a position higher than a human living space;
   a position recognition portion that recognizes a position of the rotorcraft with respect to the landing portion; and
   a remote control portion that remotely controls, on a basis of a result of recognition performed by the position recognition portion, the rotorcraft such that the rotorcraft not provided with an image capturing function lands on the landing portion,
   wherein the position recognition portion includes a plurality of image capturing portions, and at least two of the plurality of image capturing portions are provided at edges of the landing portion to be symmetric with respect to a center of the landing portion.

2. The rotorcraft landing device according to claim 1, comprising an opening/closing mechanism including the landing portion, wherein the landing portion is formed in a portion that is inside the opening/closing mechanism when the opening/closing mechanism is closed, and wherein the landing portion takes a horizontal posture at a position a space above which is open when the opening/closing mechanism is open.

3. The rotorcraft landing device according to claim 2, comprising a movable member capable of taking a first posture of extending vertically upward from a periphery of the landing portion and a second posture of extending further to an outside from the periphery of the landing portion, wherein the movable member takes the first posture when the opening/closing mechanism is closed, and the movable member takes the second posture when the opening/closing mechanism is open and the rotorcraft lands on the landing portion.

4. The rotorcraft landing device according to claim 3, wherein, in a state in which the movable member is in contact with a load released from the rotorcraft that has landed on the landing portion, the movable member is movable in such a direction as to move the load to a position closer to a center of the landing portion.

5. The rotorcraft landing device according to claim 1, comprising an opening/closing mechanism, wherein the landing portion is accommodated in an inner space when the opening/closing mechanism is closed, and wherein a space above the landing portion is open when the opening/closing mechanism is open.

6. The rotorcraft landing device according to claim 1, comprising a distance measuring portion that measures a distance from the landing portion to the rotorcraft, wherein the remote control portion controls a descending speed of the rotorcraft on a basis of a result of measurement performed by the distance measuring portion.

7. The rotorcraft landing device according to claim 1, wherein the remote control portion obtains identification information of the rotorcraft that has approached the landing portion from the rotorcraft, remotely controls the rotorcraft such that the rotorcraft lands on the landing portion in a case where the obtained identification information matches identification information of a rotorcraft that has already gained permission to land on the landing portion, and does not perform remote control in a case where the obtained identification information does not match.

8. The rotorcraft landing device according to claim 1, comprising an ascending/descending mechanism capable of descending to a residential space for humans in a state of carrying a load received from the rotorcraft that has landed on the landing portion and ascending again to a position at which the ascending/descending mechanism receives a load.

* * * * *